(12) United States Patent
Scheffel et al.

(10) Patent No.: US 10,138,856 B2
(45) Date of Patent: Nov. 27, 2018

(54) ALIGNMENT ELEMENT FOR AN INJECTOR

(71) Applicant: Robert Bosch GmbH, Stuttgart (DE)

(72) Inventors: Martin Scheffel, Vaihingen (DE); Axel Bormann, Bamberg (DE); Sebastian Wieschollek, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/412,259

(22) Filed: Jan. 23, 2017

(65) Prior Publication Data

US 2017/0130687 A1    May 11, 2017

Related U.S. Application Data

(62) Division of application No. 14/352,792, filed as application No. PCT/EP2012/068983 on Sep. 26, 2012, now Pat. No. 9,587,607.

(30) Foreign Application Priority Data

Oct. 18, 2011    (DE) .................. 10 2011 084 704

(51) Int. Cl.
*F02M 61/14*    (2006.01)
*F02M 61/16*    (2006.01)
(Continued)

(52) U.S. Cl.
CPC ............ *F02M 61/14* (2013.01); *B23K 26/20* (2013.01); *B23K 26/28* (2013.01); *F02M 61/168* (2013.01);
(Continued)

(58) Field of Classification Search
CPC .......... F02M 61/14; F02M 2200/8015; F02M 2200/8023; F02M 2200/8046;
(Continued)

(56) References Cited

U.S. PATENT DOCUMENTS 4,984,548 A * 1/1991 Hudson, Jr. .......... F02M 61/145
                                                     123/468
5,937,887 A * 8/1999 Baxter ............... F02M 51/0639
                                                     137/15.18
(Continued)

FOREIGN PATENT DOCUMENTS

DE    1873834    6/1963
DE    3600311    9/1986
(Continued)

OTHER PUBLICATIONS

International Search Report for PCT/EP2012/068983, dated Feb. 8, 2013.

*Primary Examiner* — Darren W Gorman
*Assistant Examiner* — Juan C Barrera
(74) *Attorney, Agent, or Firm* — Norton Rose Fulbright US LLP; Gerard Messina

(57) ABSTRACT

A method for manufacturing an injector having an extrusion coating, including the following steps: providing an injection module, pushing a disk-shaped alignment element onto a part of the injection module, the alignment element having a slot in order to have sufficient flexibility, welding the alignment element onto the part of the injection module, at least part of the slot also being welded shut at the same time during the welding-on step in order to stiffen the alignment element, and molding the extrusion coating onto the injection module.

8 Claims, 7 Drawing Sheets

(51) Int. Cl.
  *F16B 21/20* (2006.01)
  *B23K 26/20* (2014.01)
  *B23K 26/28* (2014.01)

(52) U.S. Cl.
  CPC ..... *F16B 21/20* (2013.01); *F02M 2200/8015* (2013.01); *F02M 2200/8023* (2013.01); *F02M 2200/8046* (2013.01); *F02M 2200/8061* (2013.01); *F02M 2200/8084* (2013.01); *Y10T 29/49888* (2015.01)

(58) Field of Classification Search
  CPC ......... F02M 2200/8061; F02M 61/168; F02M 2200/8084; F02M 2200/8092; F02M 61/167; B23K 26/28; B23K 26/20; F16B 21/20; F16B 21/205; Y10T 29/49888
  USPC .......................................... 239/533.2–533.15
  See application file for complete search history.

(56) References Cited

U.S. PATENT DOCUMENTS

| | | | |
|---|---|---|---|
| 5,954,343 A * | 9/1999 | Sumida | F02M 61/14 |
| | | | 277/434 |
| 6,811,091 B2 | 11/2004 | Dallmeyer et al. | |
| 6,811,104 B2 | 11/2004 | Kobayashi et al. | |
| 6,874,710 B2 | 4/2005 | Ishii et al. | |
| 6,880,529 B2 | 4/2005 | Pohlmann et al. | |
| 6,910,642 B2 | 6/2005 | Maier | |
| 7,104,477 B2 | 9/2006 | Kilgore et al. | |
| 7,431,226 B2 | 10/2008 | Cho et al. | |
| 7,621,469 B2 | 11/2009 | Hornby | |
| 8,104,698 B2 | 1/2012 | Hayatani et al. | |
| 2005/0066941 A1* | 3/2005 | Berger | F02M 61/14 |
| | | | 123/470 |
| 2007/0175451 A1* | 8/2007 | Beardmore | F02M 61/14 |
| | | | 123/470 |
| 2007/0228662 A1* | 10/2007 | Reiter | F02M 61/14 |
| | | | 277/313 |
| 2008/0296414 A1 | 12/2008 | Kubota et al. | |
| 2009/0261286 A1 | 10/2009 | Manubolu et al. | |
| 2010/0186717 A1* | 7/2010 | Scheffel | F02M 61/14 |
| | | | 123/470 |
| 2010/0282872 A1 | 11/2010 | Krause | |
| 2011/0000464 A1* | 1/2011 | Kannan | F02M 55/004 |
| | | | 123/470 |
| 2011/0100332 A1 | 5/2011 | Reiter | |

FOREIGN PATENT DOCUMENTS

| | | |
|---|---|---|
| DE | 10108464 | 9/2002 |
| DE | 102004049710 | 4/2006 |
| DE | 102008025788 | 11/2008 |
| JP | 0579423 | 3/1993 |
| JP | 2001505277 | 4/2001 |
| JP | 2003517140 | 5/2003 |
| JP | 2004518849 | 6/2004 |
| JP | 2005500474 A | 1/2005 |
| JP | 3712589 | 11/2005 |
| JP | 2008508465 | 3/2008 |

* cited by examiner

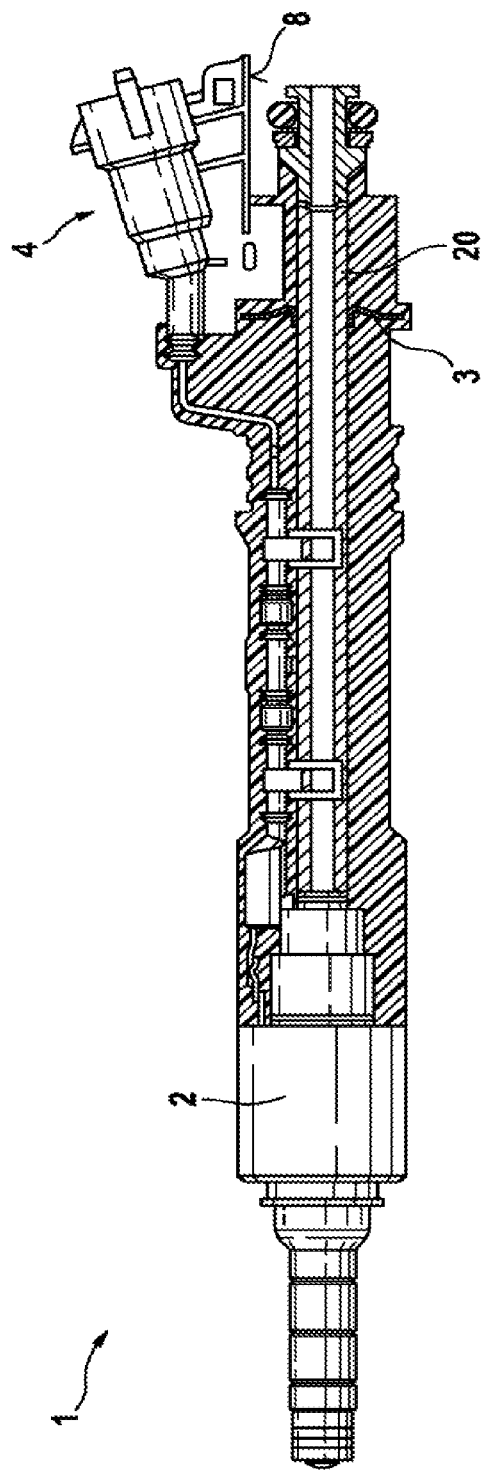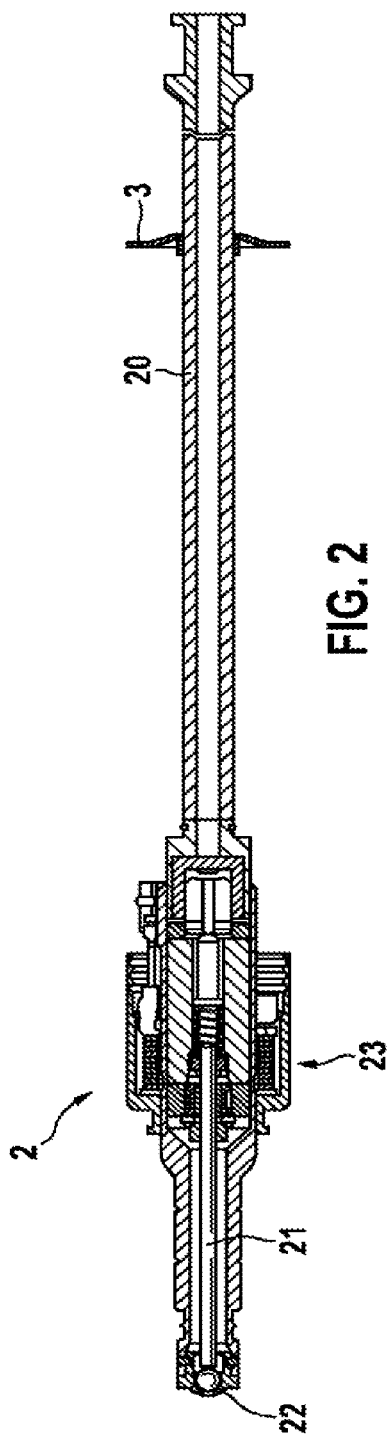

(B-B)

(C-C)

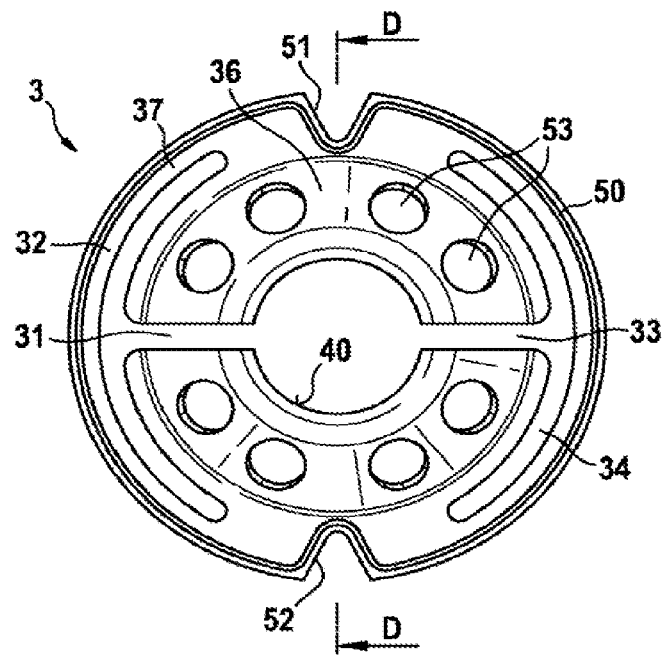
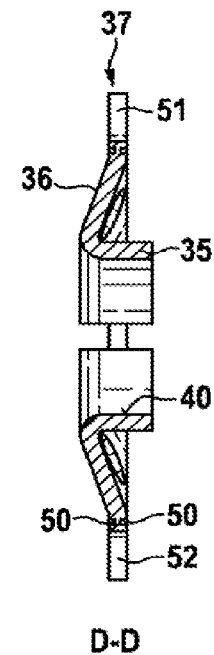
FIG. 9  FIG. 10
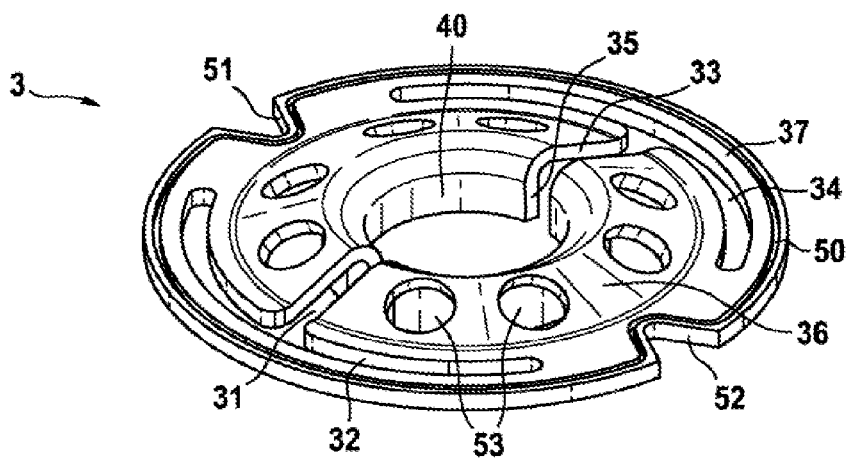
FIG. 11

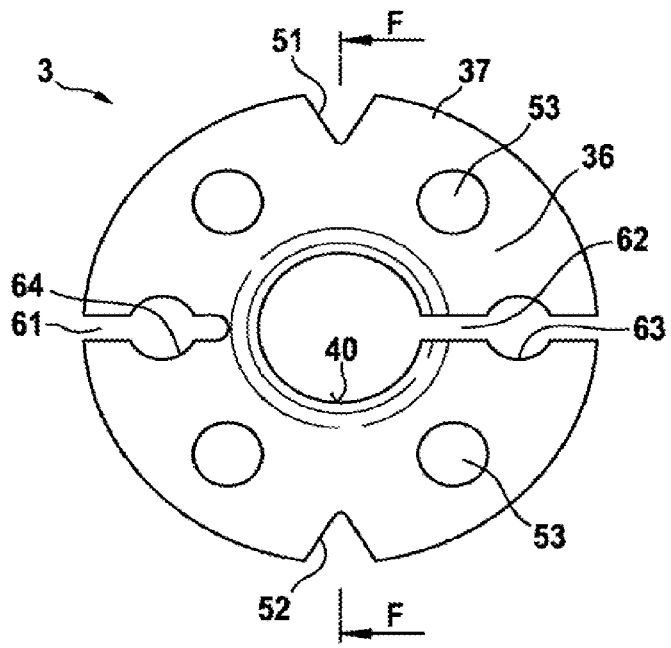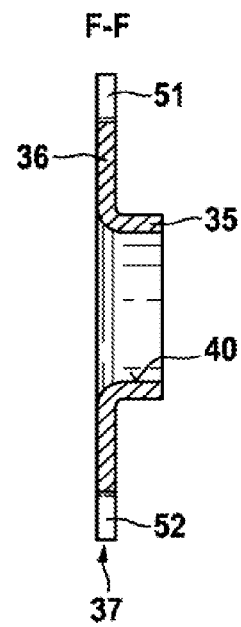
FIG. 12  FIG. 13
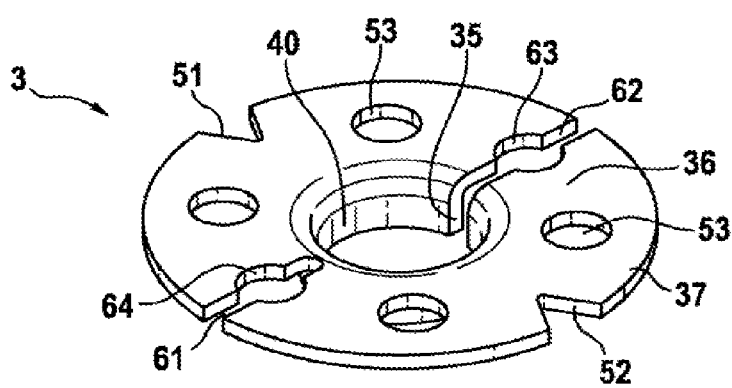
FIG. 14

ALIGNMENT ELEMENT FOR AN INJECTOR

CROSS REFERENCE TO RELATED APPLICATIONS

The present application is a divisional application of U.S. patent application Ser. No. 14/352,792, which is a national phase of International Application No. PCT/EP2012/068983, filed Sep. 26, 2012, and claims priority to German Patent Application No. 10 2011 084 704.9, filed Oct. 18, 2011, the contents of each of which are hereby incorporated by reference in their entireties.

FIELD OF THE INVENTION

The present invention relates to an alignment element for an injector and a method for manufacturing an injector having a plug molding.

BACKGROUND

Injectors are known from the related art in various embodiments. Frequently, the installation situations for injectors are different for various types of engines, in particular with regard to their alignment. However, the alignment of the injectors is important, since a different spray pattern of the injector is obtained, depending on the alignment. However, since the spray pattern has effects on the fuel consumption and exhaust gas emissions, the injector in recent engines must be very precisely aligned. One alignment option, for example, would be to provide flat polished surfaces on the injection module. However, this results in an undesirable cost increase. In addition, it may be necessary to provide a specific polished surface for each type of engine. Alternatively, an additional component having alignment surfaces could be situated on the injector. This would also have the same disadvantages as the flat polished surfaces described above, and the level of effort for the alignment is shifted to the alignment operation during installation of the additional component. In addition, recent injectors have a partial plastic extrusion coating for forming a plug-in connection. The plug-in connection could also be used here as an alignment element for the injector, but the large number of injection molds required due to the variety of engine types is likewise disadvantageous.

SUMMARY

The method according to the present invention for manufacturing an injector has the advantage that an alignment element is provided which may be easily pushed onto a part of a preassembled injection module, so that the injection module together with the alignment element may be inserted into an injection mold in an aligned manner, and the extrusion coating may be molded on in a subsequent step. The alignment element is flexible during the pushing-on operation, and is welded to the injection module with the aid of a welding step. At the same time as the welding-on operation, a stiffening of the alignment element is carried out so that the alignment element in particular withstands the subsequent injection process. For this purpose, the alignment element is essentially disk-shaped and has at least one slot. The slot provides the flexibility during the pushing-on operation. In the subsequent welding step the slot is welded shut at the same time as the alignment element is welded onto the injection module, so that the rigidity of the alignment element which is then necessary for the injection process is present. Thus, the present invention elegantly achieves the aim that on the one hand it should be easy to push on the alignment element, which requires a reduced rigidity, and on the other hand the alignment element should be as rigid as possible for the injection process in order to avoid deformation due to a high injection pressure, and thus a misalignment in the injection mold. The alignment element which is stiffened by the welding operation in particular prevents a deformation from occurring during the injection process in such a way that the alignment element comes into contact with a wall area of the injection mold, so that it would be externally visible in the finished injector. As a result, however, the injector would no longer be leak-tight against spray water. However, according to the present invention a stiffening of the alignment element is carried out at the same time as the welding-on process of the alignment element to the preferably tubular part of the injection module, so that the alignment element may be simultaneously fastened to the injection module and stiffened in one step.

For the welding-on step, the injection module together with the alignment element which is pushed onto same are particularly preferably rotated. A particularly simple welding step may be carried out in this way.

According to another preferred embodiment of the present invention, a welding plane in which the alignment element is welded to the injection module does not coincide with a welding plane in which the slot is welded shut. This allows greater freedom of design of the alignment element without thus impairing the quality of the weld seam for fixing the alignment element to the injection module.

The alignment element particularly preferably has a tongue, which for the stiffening is at least partially welded to a base area of the alignment element in the welding-on step. The tongue may be easily produced by a punching step, for example, in which the slot is also provided in the alignment element at the same time.

The alignment element also preferably has a first and/or second tab, the first and/or second tab being situated adjacent to the tongue. The tongue is then welded to the first and/or second tab in the welding-on step. As a result of this measure, welding and thus stiffening of the alignment element in a different plane may be easily provided.

The welding is particularly preferably carried out with the aid of a laser, or alternatively, with the aid of two lasers oppositely situated from one another at an angle of 180°. When two lasers are used, it is necessary to rotate the injection module by only 180°.

Moreover, the present invention relates to an alignment element for an injector, which is fastenable to a preassembled injection module and is designed for alignment in an injection mold in order to apply an extrusion coating, in particular a plug molding, to the injection module. The alignment element includes a collar extending in the axial direction, a base area radially adjoining the collar, and an edge area radially adjoining the base area. In addition, a central through opening and a first slot, which is oriented in the radial direction and has a continuous design in the axial direction of the alignment element, are provided. The first slot extends radially outwardly, starting from the through opening. This results in flexibility of the alignment element, in particular in the area of the inner collar. Thus, this allows the alignment element to be very easily pushed onto a part of the injection module, which in particular is tubular. The collar is then welded to the injection component in the subsequent fastening step, and the alignment element is thus stiffened. An extrusion coating, in particular a plug receptacle, may be subsequently molded on, preferably in the area of the alignment element. The through opening is preferably elliptical.

The alignment element also preferably includes at least one second curved slot which is oriented in the peripheral direction and which likewise has a continuous design in the axial direction. Providing a slot which is oriented in the radial direction and a slot which is oriented in the peripheral direction results in flexibility in the radial and axial directions as well as in the peripheral direction, so that the alignment element may be pushed on in a particularly easy manner.

The first and second slots of the alignment element preferably intersect. This results in a further increase in the flexibility of the alignment element, thus making it even easier to push on the alignment element.

According to another preferred embodiment of the present invention, the alignment element also includes a tongue which protrudes into one of the slots. As a result of the tongue, particularly simple stiffening of the alignment element via a welding operation may be achieved by welding the tongue to a part of the alignment element. At the same time, at least one of the slots, preferably all slots, is/are preferably shut by the welding.

The alignment element also preferably includes a first and/or second tab which is/are situated at the base area, and the first and/or second tab is/are preferably situated adjacent to the tongue, and the tabs may thus be welded to the tongue during the welding step.

For even greater flexibility of the alignment element, the alignment element also includes a third slot which is oriented in the radial direction and is axially continuous, and/or a fourth slot which is oriented in the peripheral direction and is axially continuous, and the first and third slot and the second and fourth slot are particularly preferably formed symmetrically with respect to a center plane through the alignment element.

The alignment element also preferably includes a second slot which is oriented in the radial direction, at least one of the radial slots, as the continuous slot in the radial direction, extending from the through opening to the edge of the alignment element. As a result, the alignment element has a C shape and is no longer closed at at least one area in the peripheral direction. The alignment element may thus be spread apart in the peripheral direction, so that even greater ease of installation is achieved.

In addition, at least one of the slots preferably has an expanded area. The expanded area may be curved, for example. In particular after completion of an injection pass in which the slots are filled by the injection molding material, this results in improved rigidity and reliable filling of the relatively narrow slots with injection molding material.

The alignment element also preferably includes a base area which is inclined with respect to a base plane.

To obtain even better permeability of the injection molding material, the alignment element preferably has a plurality of through openings, in particular circular through openings, at the base area. To also allow simple and reliable alignment of the alignment element in the injection molding die, the alignment element preferably has at least one feature at the edge area for the alignment. The feature for alignment is preferably a recess, for example a V-shaped indentation or a linear contact surface at the edge area of the alignment element. Two alignment features are particularly preferably oppositely situated from one another at an angle of 180°.

To ensure that a high degree of fluid-tightness is obtained between the alignment element and the injection molding material after the injection operation, the alignment element preferably has a labyrinth configuration having at least one groove. Multiple grooves, which in particular are situated coaxially with respect to one another and extend in the peripheral direction, are preferably provided. A secure seal between the injection molding material and the alignment element may be achieved due to this labyrinth configuration. The labyrinth configuration is preferably provided on both flat sides of the alignment element. The alignment element is therefore suited in particular for applications in vehicles, in which contact with spray water or the like cannot be ruled out.

Moreover, the present invention relates to an injector having an alignment element according to the present invention on which an extrusion coating, in particular for a plug, is molded on. The alignment element is preferably completely enclosed by the extrusion coating. One or multiple alignment surface(s) or the like for the alignment is/are preferably provided on the extrusion coating for an installation in an internal combustion engine. The alignment element allows alignment surfaces to be molded onto the extrusion coating in a very precise manner.

BRIEF DESCRIPTION OF THE DRAWINGS

FIG. 1 shows a schematic, partially sectional view of an injector having a first alignment element according to the present invention.

FIG. 2 shows a schematic sectional view of an injection module of the injector shown in FIG. 1.

FIGS. 9 through 11 show illustrations of an alignment element according to a second exemplary embodiment of the present invention.

FIGS. 12 through 14 show illustrations of an alignment element according to a third exemplary embodiment of the present invention.

DETAILED DESCRIPTION

Figure 3:
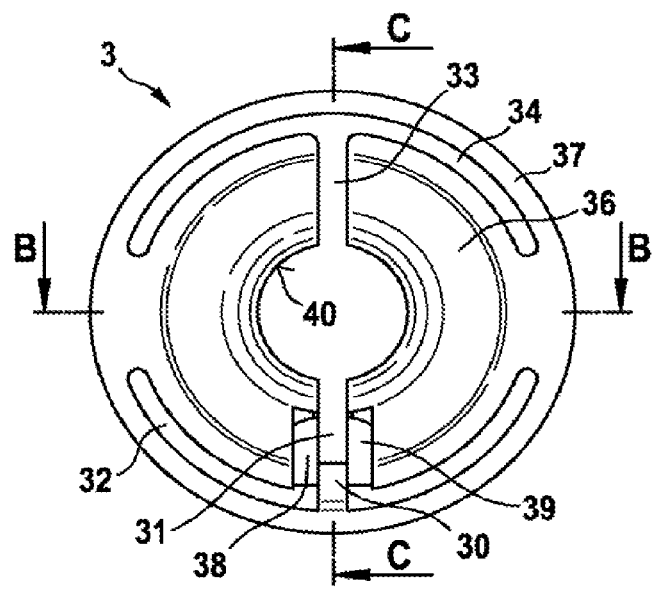
FIG. 3 shows a schematic top view of the alignment element.
Figure 4:
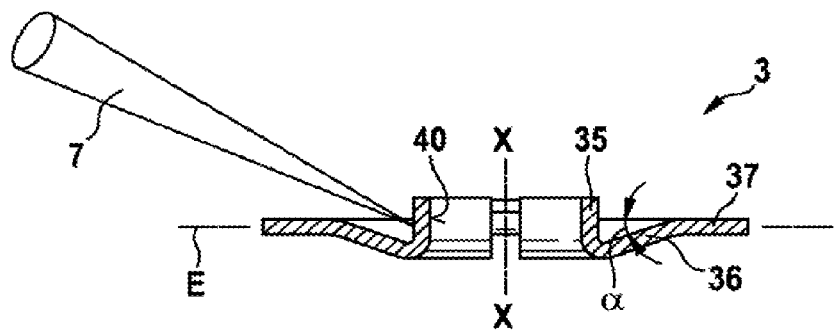
FIG. 4 shows a schematic sectional view along line B-B in FIG. 3.
Figure 5:
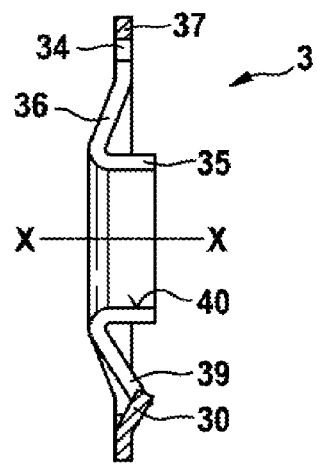
FIG. 5 shows a sectional view along line C-C in FIG. 3.
Figure 6:
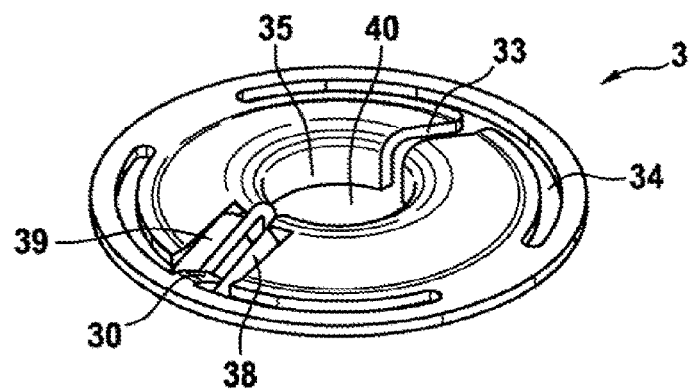
FIG. 6 shows a perspective view of the alignment element.
Figure 7:
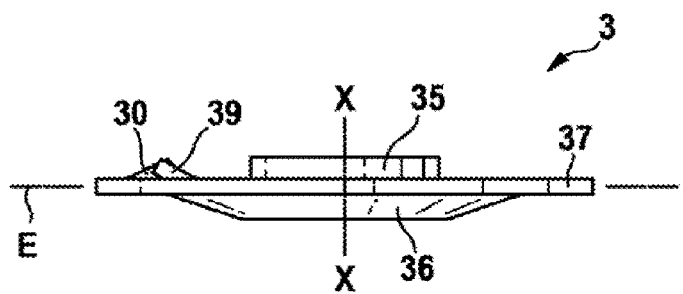
FIG. 7 shows a side view of the alignment element.

An injector having a first alignment element 3 according to the present invention as well as a method for manufacturing the injector are described in greater detail below, with reference to FIGS. 1 through 8.

As is apparent from FIG. 1, injector 1 includes an injection module 2, shown in greater detail in FIG. 2, which in the present exemplary embodiment includes a solenoid actuator 23 in order to move a valve needle 21. The valve needle opens up or closes a valve seat 22 at one end of the injector. Injector 1 also includes a plug molding 4 (extrusion coating) which is molded onto injection module 2 shown in FIG. 2. Injection module 2 is a preassembled module. A disk-shaped alignment element 3 is preassembled on a tubular part 20 of injection module 2. Injection module 2 is inserted into an injection mold with the aid of alignment element 3, and plug molding 4 is then molded on. Plug molding 4 has an alignment surface 8 which, the same as for the actual plug-in connection, must be individually fabricated for the particular customer and his requirements. Alignment surface 8 is subsequently used for aligning the injector during the step of installing the injector in the internal combustion engine, so that the spray pattern provided by the injector corresponds to the customer's requirements. Therefore, even during the process of molding on the plug molding, injection module 2 must be correctly aligned in the injection mold so that the spray alignment of the injector subsequently matches alignment surface 8, which is provided on the extrusion coating via the injection process.

Alignment element 3 is illustrated in greater detail in FIGS. 3 through 8. Alignment element 3 is an essentially disk-shaped element, and has a central through opening 40. Through opening 40 is delimited by a circumferential collar 35 which protrudes in axial direction X-X of the alignment element. Collar 35 is adjoined by a base area 36 which is inclined with respect to a base plane E of alignment element 3, the base area being adjoined by a terminating edge area 37. Edge area 37 is situated in base plane E of alignment element 3. Alignment element 3 also includes a first slot 31, a second slot 32, a third slot 33, and a fourth slot 34. First slot 31 and third slot 33 extend in the radial direction, starting from a center axis of alignment element 3, and are oppositely situated from one another at an angle of 180° (see FIG. 3). Second slot 32 and fourth slot 34 extend in the peripheral direction over a circular angle of approximately 150° in each case. First slot 31 intersects second slot 32, and third slot 33 intersects fourth slot 34. All slots are continuous in axial direction X-X. This results in a high degree of flexibility of alignment element 3. Flexibility results in axial direction X-X of alignment element 3, in particular due to second and fourth slots 32, 34, respectively, as well as in the radial direction with respect to the center axis, in particular due to first and third slots 31, 33, respectively.

Alignment element 3 also includes a tongue 30 which protrudes radially inwardly into first slot 31, starting from edge area 37. As is apparent in particular from FIG. 5, tongue 30 is still slightly bent in axial direction X-X. Alignment element 3 also includes a first tab 38 and a second tab 39. First and second tabs 38, 39, respectively, are likewise bent from base area 36 in axial direction X-X, in the same direction as tongue 30 (see FIG. 5). In the process, tongue 30 contacts the two tabs 38, 39 at the side. As is most clearly apparent from FIGS. 5, 6, and 7, a contact zone results between tongue 30 and the two tabs 38, 39 outside base plane E of the alignment element. Alternatively, a small distance which is not critical for the welding operation may be provided between the tongue and the tabs, the distance being bridged by the welding operation.

Figure 8:
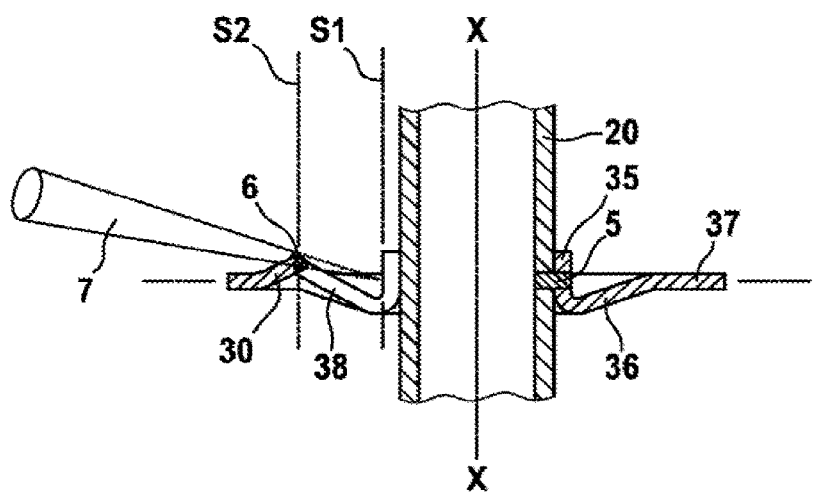
FIG. 8 shows a schematic illustration of the welding operation of the alignment element to a part of the injection module.

Due to the high degree of flexibility of alignment element 3 in axial direction X-X as well as in the radial direction, alignment element 3 may be quickly and easily pushed onto a tubular part 20 of injection module 2. A position of the alignment element in the pushed-on state onto tubular part 20 may also still be slightly corrected if necessary. The position of alignment element 3 is therefore important in order to ensure an alignment of injection module 2 in an injection molding die in order to mold on plug molding 4 in the correct alignment with respect to injection module 2. In order for alignment element 3 not to be displaced during the injection process, it is welded to tubular part 20 via a weld joint, using a laser beam 7. This results in a weld seam 5 between collar 35 of alignment element 3 and tubular part 20 (see FIG. 8). For the welding operation, tubular part 20 is rotated together with alignment element 3. As shown in FIG. 8, laser beam 7 no longer comes into contact with collar 35 or tubular part 20 in the area of tongue 30, but instead comes into contact with tongue 30, which protrudes in axial direction X-X, and protruding tabs 38, 39. Tongue 30 is thus welded to tabs 38 and 39. As is apparent from FIG. 8, a welding plane S2 in which tongue 30 is welded to tabs 38, 39 is situated outside normal welding plane S1 in which collar 35 is welded to tubular part 20. Alignment element 3 is stiffened as the result of welding tongue 30 to tabs 38, 39. Alignment element 3 is thus able to withstand the strong pressures during the subsequent injection process for manufacturing plug molding 4, without alignment element 3 being bent or changed in its position.

Thus, due to the shape of alignment element 3, laser beam 7 is interrupted in the area of the tongue during the welding operation, laser beam 7 being adjusted in such a way that it is possible to weld the tongue to the tabs outside the actual focus of the laser beam. Since first slot 31 of alignment element 3 is provided in the area of tongue 30 anyway, collar 35 is shielded only in the area of tabs 38, 39. However, this reduces the weld joint 5 along collar 35 only negligibly, by a width of the tabs.

Thus, with the aid of a single welding operation, while rotating tubular part 20, alignment element 3 may be welded to tubular part 20, as well as stiffened in the area of tongue 30 and tabs 38, 39. It is pointed out that a correspondingly formed tongue and correspondingly formed tabs may also be provided in the area of third slot 33 in order to automatically provide a second stiffening on the alignment element.

According to the present invention, alignment element 3 may thus have sufficient flexibility for installation, so that the installation may be carried out quickly and easily, and in particular very precisely. Alignment element 3 is also subsequently stiffened at the same time as alignment element 3 is fixed to tubular part 20, it being possible for the stiffening and fixing of the alignment element to be carried out in one step due to the tongue and the tabs of alignment element 3. According to the present invention, the manufacture of an injector may thus be significantly simplified and reduced in cost, and at the same time the precision of a subsequent necessary alignment of the injector in an internal combustion engine may be even further improved.

Further exemplary embodiments of the present invention are described below in greater detail, identical or functionally equivalent parts being denoted by the same reference numerals as in the first exemplary embodiment.

An alignment element 3 according to a second exemplary embodiment of the present invention is illustrated in greater detail in FIGS. 9 through 11. As is apparent from the top view in FIG. 9, alignment element 3 of the second exemplary embodiment includes two alignment features in the form of a first and second V-shaped indentation 51, 52, respectively, at edge area 37. In addition, a plurality of circular through openings 53 is provided. The alignment element may be reliably aligned in the injection molding die via V-shaped indentations 51, 52. Furthermore, during the injection process, through openings 53 ensure that the injection molding material is able to reliably and quickly enter on both sides of alignment element 3. As is apparent in particular from FIGS. 9 and 11, alignment element 3 of the second exemplary embodiment may be manufactured very easily and cost-effectively, in particular since no tabs and/or tongues are provided. In addition, alignment element 3 of the second exemplary embodiment has a labyrinth configuration 50. In this exemplary embodiment, labyrinth configuration 50 includes a circumferentially closed groove, a groove being provided on both sides of the alignment element. These two grooves ensure that very good sealing, in particular from the outside toward the inside, is possible after the injection process. Fluid-tightness of an injector in the area of alignment element 3 may thus be further improved.

FIGS. 12 through 14 show an alignment element 3 according to a third exemplary embodiment of the present invention. Alignment element 3 of the third exemplary embodiment has no circumferential slots, but instead has two slots 61, 62 extending in the radial direction. Slot 62 is designed as a radially continuous slot from central through opening 40 to edge area 37. Alignment element 3 thus has a C shape in a top view (see FIG. 12). Slot 62, which is continuous from collar 35 to edge area 37, in particular provides improved flexibility in the axial direction. In addition, alignment element 3 may also be spread apart slightly in the peripheral direction, so that a particularly simple and quick installation is possible. In addition, alignment element 3 of the third exemplary embodiment has expanded areas 63, 64 which are provided at slots 61, 62, respectively. This ensures that the injection molding material also completely fills slots 61, 62, since the slots are each relatively narrow. In addition, edge area 37 and base area 36 of alignment element 3 are situated in a shared plane (see the cross section in FIG. 13).

Figure 15:
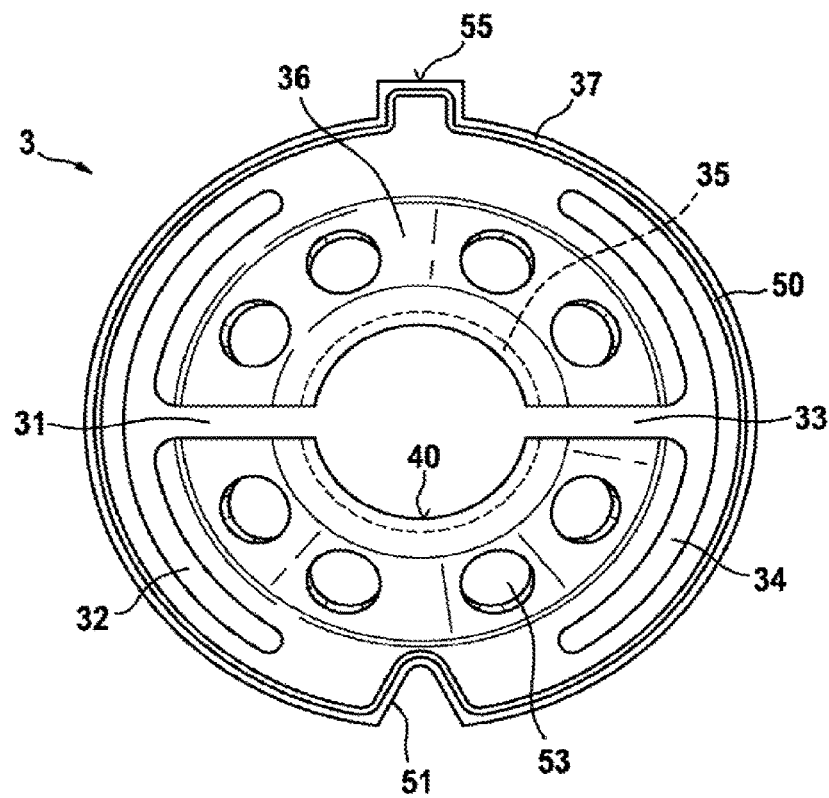
FIG. 15 shows a schematic top view of an alignment element according to a fourth exemplary embodiment of the present invention.
Figure 16:
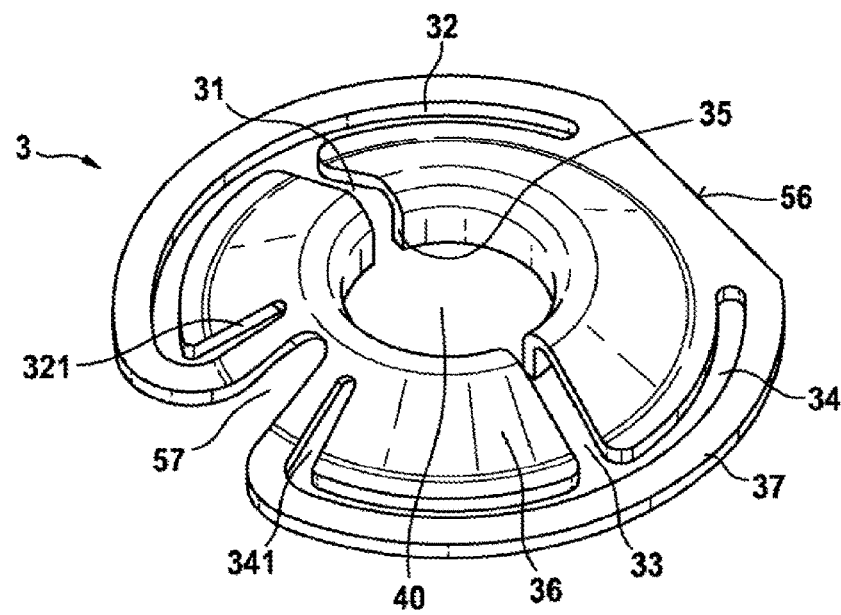
FIG. 16 shows a perspective illustration of an alignment element according to a fifth exemplary embodiment of the present invention.
Figure 17:
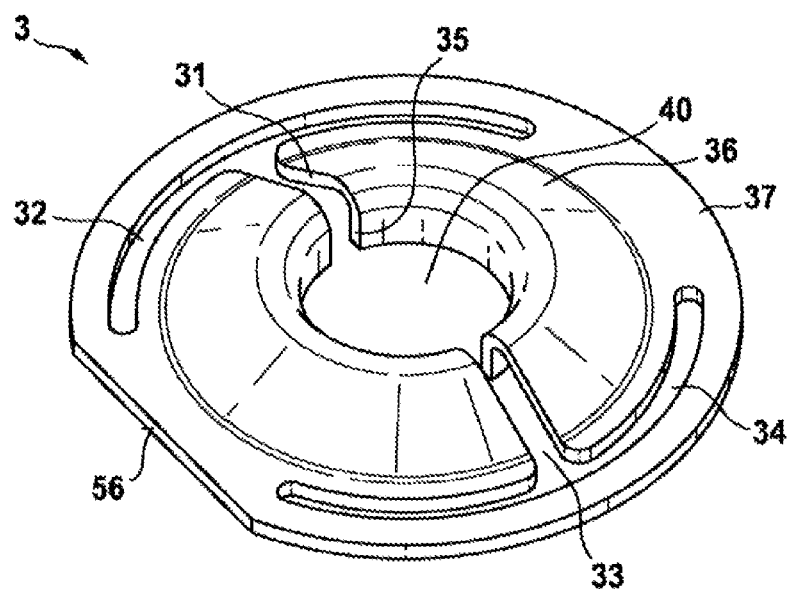
FIG. 17 shows a perspective illustration of an alignment element according to a sixth exemplary embodiment of the present invention.

FIGS. 15 through 17 show further exemplary embodiments of the present invention. In the fourth exemplary embodiment shown in FIG. 15, a contact surface 55 protruding in the radial direction and a V-shaped indentation 51 are provided as an alignment feature at edge area 37 of alignment element 3. Indentation 51 and contact surface 55 are oppositely situated from one another at an angle of 180°. The fifth exemplary embodiment of alignment element 3 shown in FIG. 16 shows a linear contact surface 56 resulting from removal of material at edge area 37. For further improvement in flexibility, slots 34, 32 extending in the peripheral direction have a first and a second radially inwardly oriented extended slot 321 and 341, respectively. The two extended slots 321, 341 extend in parallel to a recessed indentation 57 which is likewise used for the alignment. In addition, no through openings are provided in the fifth exemplary embodiment. The sixth exemplary embodiment shown in FIG. 17 likewise has a contact surface 56 resulting from removal of material at outer edge area 37 of the alignment element. However, in the sixth exemplary embodiment the extended slots of the fifth exemplary embodiment as well as the recessed indentation of the fifth exemplary embodiment are absent. The sixth exemplary embodiment may thus be manufactured very easily and cost-effectively.

What is claimed is:

1. An alignment element for an injector, comprising:
 a collar extending in an axial direction of the alignment element;
 a base area radially adjoining the collar;
 an edge area radially adjoining the base area;
 a central through opening delimited by the collar;
 at least one first slot oriented in a radial direction and extending radially outwardly from the through opening, wherein the slot has a continuous design in the axial direction; and
 a tongue adjoining the edge area and protruding into the at least one first slot,
 wherein the tongue is bent from the edge area toward the axial direction.

2. The alignment element as recited in claim 1, further comprising at least one second slot oriented in a peripheral direction, the at least one first slot and the at least one second slot forming a continuous design in the axial direction.

3. The alignment element as recited in claim 2, wherein the at least one first slot and the at least one second slot intersect.

4. The alignment element as recited in claim 3, wherein the tongue protrudes into the at least one second slot.

5. The alignment element as recited in claim 4, further comprising at least one of a first tab and a second tab situated on the base area, adjacent to the tongue.

6. The alignment element as recited in claim 2, further comprising at least one of a third slot oriented in the radial direction and a fourth slot oriented in the peripheral direction, at least one of the third slot and the fourth slot having a continuous design in the axial direction.

7. The alignment element as recited in claim 1, wherein the base area is inclined at an angle with respect to a base plane of the alignment element.

8. An injector, comprising:
 an alignment element for an injector, comprising:
  a collar extending in an axial direction of the alignment element;
  a base area radially adjoining the collar;
  an edge area radially adjoining the base area;
  a central through opening delimited by the collar; and
  at least one first slot oriented in a radial direction and extending radially outwardly from the through opening, wherein the slot has a continuous design in the axial direction;
 an extrusion coating having an alignment surface; and
 a tongue adjoining the edge area and protruding into the at least one first slot,
 wherein the tongue is bent from the edge area toward the axial direction.

* * * * *